US006784996B2

(12) United States Patent
Ikeda et al.

(10) Patent No.: US 6,784,996 B2
(45) Date of Patent: Aug. 31, 2004

(54) COLOR SORTING APPARATUS FOR GRANULAR OBJECT WITH OPTICAL DETECTION DEVICE CONSISTING OF CCD LINEAR SENSOR

(75) Inventors: Norimasa Ikeda, Tokyo (JP); Nobuyoshi Ikeda, Tokyo (JP)

(73) Assignee: Satake Corporation (JP)

( * ) Notice: Subject to any disclaimer, the term of this patent is extended or adjusted under 35 U.S.C. 154(b) by 147 days.

(21) Appl. No.: 10/291,120

(22) Filed: Nov. 7, 2002

(65) Prior Publication Data

US 2003/0098978 A1 May 29, 2003

(30) Foreign Application Priority Data

Nov. 9, 2001 (JP) ....................................... 2001-344429
Aug. 27, 2002 (JP) ....................................... 2002-246060

(51) Int. Cl.[7] .................................................. G01J 3/50
(52) U.S. Cl. ....................... 356/406; 356/425; 250/226; 209/581
(58) Field of Search ................................ 356/402, 405, 356/406, 407; 250/226; 209/580, 581, 582

(56) References Cited

U.S. PATENT DOCUMENTS

| | | | |
|---|---|---|---|
| 2,504,731 | A | 4/1950 | Rose et al. |
| 2,587,686 | A | 3/1952 | Berry |
| 3,738,484 | A | 6/1973 | Hoover et al. |
| 3,802,558 | A | 4/1974 | Rhya |
| 3,990,581 | A | 11/1976 | Tengsater |
| 4,088,227 | A | 5/1978 | Lockett |
| 4,099,620 | A | 7/1978 | Kendall et al. |
| 4,231,478 | A | 11/1980 | Stone |
| 4,236,640 | A | 12/1980 | Knight |
| 4,314,645 | A | 2/1982 | Perkins, III et al. |
| 4,319,269 | A | 3/1982 | Kajiura et al. |
| 4,520,702 | A | 6/1985 | Davis et al. |
| 4,576,482 | A | 3/1986 | Pryor |
| 4,581,632 | A | 4/1986 | Davis et al. |
| 4,738,175 | A | 4/1988 | Little et al. |
| 4,829,380 | A | 5/1989 | Iadipaolo |
| 4,853,533 | A | 8/1989 | Little et al. |
| 4,906,099 | A | 3/1990 | Casasent |
| 5,060,290 | A | 10/1991 | Kelly et al. |
| 5,090,574 | A | 2/1992 | Hamby |
| 5,119,205 | A | 6/1992 | Lemelson |
| 5,151,822 | A | 9/1992 | Hekker et al. |
| 5,197,607 | A | 3/1993 | Hakansson |
| 5,283,641 | A | 2/1994 | Lemelson |
| 5,318,173 | A | 6/1994 | Datari |
| 5,335,293 | A | 8/1994 | Vannelli et al. |
| 5,487,472 | A | 1/1996 | Satake et al. |
| 5,509,537 | A | 4/1996 | Crismon et al. |
| 5,526,437 | A | 6/1996 | West |
| 5,659,624 | A | 8/1997 | Fazzari et al. |

FOREIGN PATENT DOCUMENTS

| | | |
|---|---|---|
| JP | 2-204213 | 8/1990 |

*Primary Examiner*—F. L. Evans
(74) *Attorney, Agent, or Firm*—Wells St. John P.S.

(57) ABSTRACT

An optical detection device for use in a color sorting apparatus for granular objects includes a CCD linear sensor. The CCD linear sensor comprises a plurality of light receiving elements arranged in one row each of which is capable of detecting red, green and blue wavelengths. The CCD linear sensor receives light from a granular object and a background which are irradiated by a red light source, a green light source and a blue light source. The red, green and blue light sources are switched over while the granular object is passing within an optical detection area. The CCD linear sensor receives light from the granular object in synchronization with the above switching operation of the light sources.

4 Claims, 10 Drawing Sheets

COLOR SORTING APPARATUS FOR GRANULAR OBJECT WITH OPTICAL DETECTION DEVICE CONSISTING OF CCD LINEAR SENSOR

CROSS REFERENCE TO RELATED APPLICATION

This application relates to and claims priority to corresponding Japanese Application No. 2001-344429, which was filed on Nov. 9, 2001, and corresponding Japanese Application No. 2002-246060, which was filed on Aug. 27, 2002.

RELATED APPLICATIONS

This application relates to and claims priorities from corresponding Japanese Patent Application No. 2001-344429 filed on Nov. 9, 2001 and Japanese Patent Application No. 2002-246060 filed on Aug. 27, 2002.

BACKGROUND OF THE INVENTION

1. Field of the Invention

The present invention relates to a color sorting apparatus for sorting out colored granular objects or foreign objects which have been mixed into the raw granular objects such as grains or resin pellets, and more particularly to an optical detection device for use in such color sorting apparatus.

2. Description of the Related Art

A conventional known color sorting apparatus of this kind is so constructed that raw granular objects supplied from an upper portion of an inclined flow chute flow down on the flow chute; light is irradiated on the granular objects which are released from a lower end of the flow chute along a falling locus A; light obtained from each granular object arriving and passing at an optical detection position is detected by an optical sensor; and the colored granular objects or foreign objects are determined based on the detected signal and removed from the remaining acceptable granular objects. As the above optical sensor, used is a CCD linear sensor which utilizes the three primary colors of RGB (Red, Green and Blue) for the detection of the colored granular objects (hereinafter referred to as a "color CCD linear sensor").

The color CCD linear sensor includes the following types. As a first type, as shown in FIG. 10, a CCD linear sensor 100 having a filter which allows only the red (R) wavelength to pass (hereinafter referred to as "R-CCD linear sensor"), a CCD linear sensor 101 having a filter which allows only the green (G) wavelength to pass (hereinafter referred to as "G-CCD linear sensor") and a CCD linear sensor 102 having a filter which allows only the blue (B) wavelength to pass (B-CCD linear sensor) are independently arranged. In FIG. 11, there is shown a modified arrangement in which a dichroic mirror 103 is provided to cause the reflected and transmitted light to enter the respective R-, G- and B-CCD linear sensors 100, 101 and 102.

As a second type, as shown in FIG. 12, there is another arrangement in which the R-CCD linear sensor 100, the G-CCD linear sensor 101 and the B-CCD linear sensor 102 are arranged vertically in three rows.

As a third type, as shown in FIG. 13, there is an in-line type CCD linear sensor 104 in which a light receiving element 104*a* with a filter permitting the passing of only the red (R) wavelength, a light receiving element 104*b* with a filter permitting the passing of only the green (G) wavelength and a light receiving element 104*c* with a filter permitting the passing of only the blue (B) wavelength are sequentially arranged in one row.

However, the above explained conventional CCD linear sensors have the following problems. As for the first type, since three separate CCD linear sensors 100, 101 and 102, and the dichroic mirror 103 are necessitated, the dimension and the cost of the optical detection device unavoidably become large and high. As for the second type, the dimension of the device can be more compact than that of the first type because the three CCD linear sensors 100, 101 and 102 are integrally arranged in three rows. However, to the respective R-CCD linear sensor 100, G-CCD linear sensor 101 and B-CCD linear sensor 102, light from the focal points X1, X2 and X3 which are not on the same optical detection point X but are deviated vertically with one another enters as shown in FIG. 12. For this reason, with respect to the surface of the granular object which is subjected to the optical detection, the optical detection for the respective RGB wavelengths within one scanning is performed based on the individual focal points X1, X2 and X3. For example, from the point where R-wavelength is detected, no detection of G- and B-wavelength data is performed. That is, it has been difficult to obtain the RGB-wavelength data from the entire surface of the object to be optically detected. Therefore, there has been a demand of further improvement in the precision of acceptable and unacceptable detection based on RGB-wavelength data.

As for the third type, since this is a horizontally in-line CCD linear sensor 104, the dimension of the optical detection device can be made more compact than that of the second type. However, since the structure of the CCD linear sensor 104 is such that, as described above, the filter which allows the passing of only the R-wavelength, the filter which allows the passing of only the G-wavelength and the filter which allows the passing of only the B-wavelength are sequentially arranged in one row, the respective R-, G- and B-wavelengths are optically detected from one side to the other side at the optical detection position X as shown in FIG. 14. For this reason, with respect to the optically detected surface of one granular object S, for example, the G- and B-wavelengths are not optically detected at the portion where the R-wavelength has been detected as understood from FIG. 15. Therefore, there has been a demand of further improvement in the detection accuracy on the RGB basis in the same manner as in the above second type.

Therefore, the principal object of this invention is to provide an optical sorting apparatus for granular objects in which the sorting accuracy is enhanced and the cost thereof is reduced.

SUMMARY OF THE INVENTION

According to the present invention, there is provided a color sorting apparatus for granular objects comprising:

- a transferring means for transferring raw granular objects to an optical detection area;
- an optical detection means arranged around a falling locus of the raw granular objects which are released from the transferring means, the optical detection means comprising a CCD linear sensor, an illuminating means and a background means, the optical detection means functioning to detect light from the background means and each of the granular objects irradiated by the illuminating means, the CCD linear sensor including a plurality of light receiving elements arranged in at least one row, each being capable of detecting red, green and blue wavelengths, and the illuminating means including a red light source, a green light source and a blue light source;

a control means for determining whether a granular object at the optical detection area is an acceptable one or an unacceptable one based on the comparison between the detected light signal received by the CCD linear sensor and a threshold value established in advance, wherein the control means sequentially switches over the red, green and blue light sources while the granular object is passing within the optical detection area, and wherein the CCD linear sensor receives light from the granular object in synchronization with the switching of said light sources; and a sorting means for removing the unacceptable granular object from the falling locus in response to a rejection signal from the control means.

In the above color sorting apparatus, it is preferable that a condition $V \leqq L/3T$ is satisfied, wherein T represents a speed of one scanning of the CCD linear sensor, V represents a falling speed of the granular object, and L represents a length of the optical detection area for the CCD linear sensor in the direction of the falling locus.

According to the above arrangement, the red, green and blue light sources are sequentially switched over while the granular object is passing within the predetermined optical detection area and, in synchronization with this switching operation of the light sources, the CCD linear sensor detects the red, green, blue wavelengths from the entire surface of each granular object to be optically detected. In this way, it is possible to obtain a color signal consisting of three, red, green and blue wavelengths from the entire surface of the granular object to be optically detected.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
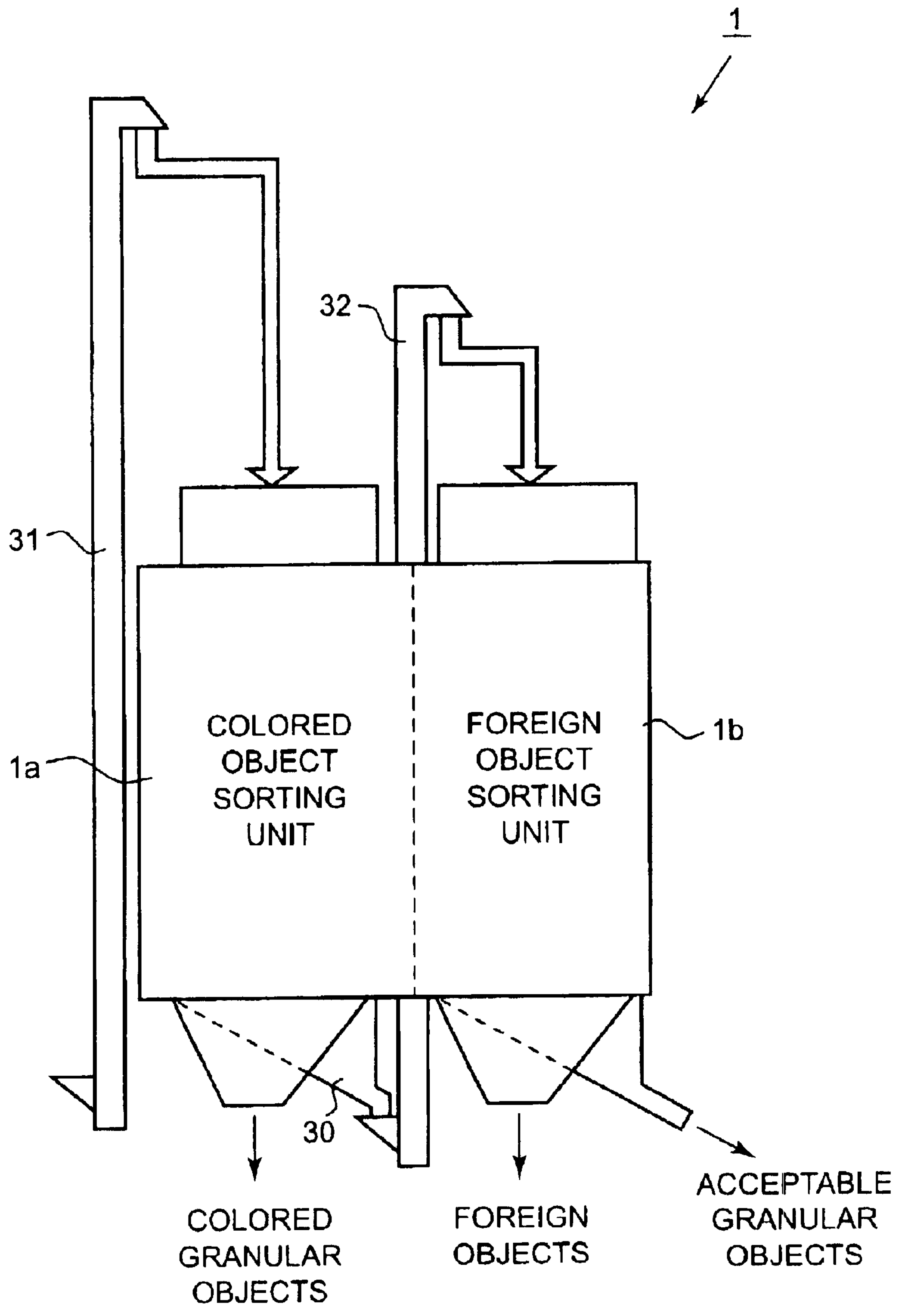
FIG. 1 is a front elevational view of the color sorting apparatus of the present invention.
Figure 2:
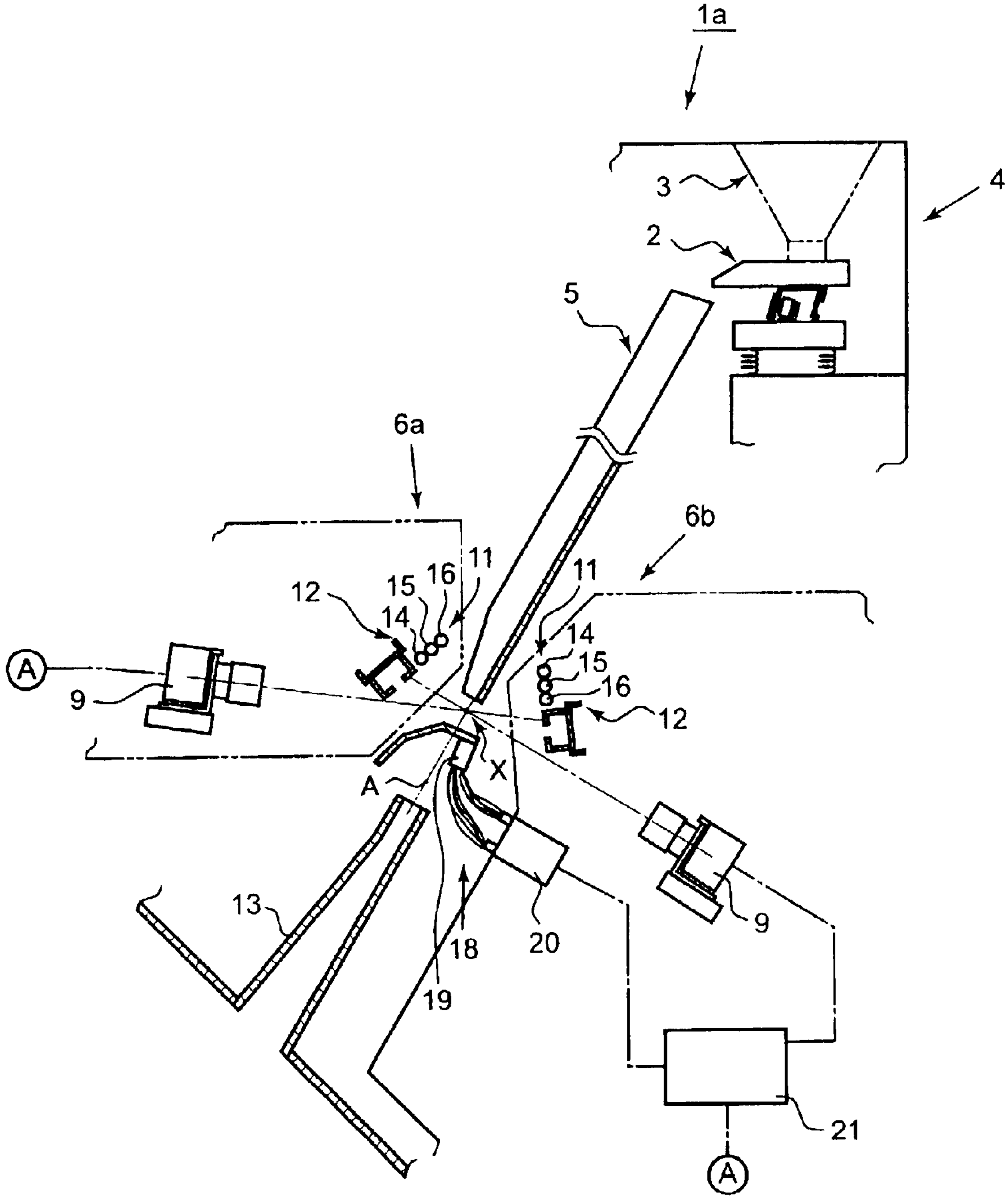
FIG. 2 is a side sectional view of the colored object sorting unit in the color sorting apparatus.

Hereinafter, some preferred embodiments of the invention will be explained with reference to the accompanying drawings. FIG. 1 is a diagrammatic front elevational view of a color sorting apparatus 1 of the present invention. The color sorting apparatus 1 comprises a colored object sorting unit 1*a* and a foreign object sorting unit 1*b*. FIG. 2 is a side sectional view of the colored object sorting unit 1*a*. At an upper part of the colored object sorting unit 1*a*, there is provided a transferring means 4 which comprises a supply hopper 3 to which raw granular objects are supplied, a vibration feeder 2 which forwards out the granular objects in the supply hopper 3, and an inclined flow chute 5 on which the granular objects fed by the vibration feeder 2 flow down. The granular object released from the lowermost end of the flow chute 5 naturally falls down along a falling locus A. Around the falling locus A, there is provided an optical detection unit 6 consisting of a first and a second optical detection means 6*a* and 6*b*. The first and second optical detection means 6*a* and 6*b* are arranged at both the sides of the falling locus A with this falling locus A being sandwiched therebetween so that the front side and the rear side of the granular object can be optically detected. Each of the first and second optical detection means 6*a* and 6*b* has a visible light receiving means 9 having a built-in CCD linear sensor 7 for detecting the red, green and blue wavelengths (light beams) and a built-in condenser lens 8; a light illuminating means 11 consisting of light sources 14, 15 and 16 for emitting the red, green and blue light, respectively; and a background plate 12. It is preferable that each of the light sources 14, 15 and 16 is constituted by light emitting diode (LED).

Figure 3:
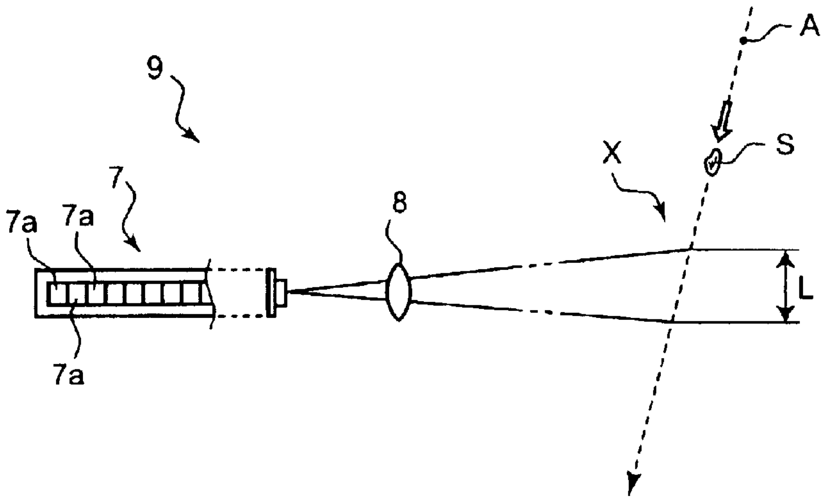
FIG. 3 is a diagrammatic view for showing the relation between the visible light receiving means and the optical detection area.

The above CCD linear sensor 7 is so constructed that a plurality of light receiving elements 7*a*, for example, Si elements, each of which is capable of detecting any of the red, green and blue light, are arranged in one row (see FIG. 3). The condenser lens 8 in the visible light receiving means 9 is adjusted such that the light from the optical detection location X on the falling locus A or the reflected light from the background plate 12 effectively enters into the above CCD linear sensor 7. The optical detection location (focus point) X on the falling locus A, at which location the light enters into the CCD linear sensor 7, has a predetermined length (L) (optical detection area) along the falling locus A as shown in FIG. 3. It is preferable that the predetermined length (L) satisfies the condition $V=L/3T$, wherein the scanning speed of one scan of the above CCD linear sensor 7 is T(s), the falling speed of the granular object is V(mm/s), and the above predetermined length of the optical detection area (focus point) X is L(mm).

Underneath the above optical detection position X along the above falling locus A, there is provided a sorting means 18 for sorting out the colored granular objects (defective ones) which are detected by the optical detection. The sorting means 18 comprises a jet nozzle 19 provided near the falling locus A, a valve 20 connected to the jet nozzle 19 through an appropriate conduit, and a high pressure air source (not shown) connected to the valve 20 through an appropriate conduit. Underneath the above jet nozzle 19 along the falling locus A, there is provided a collecting tube 13 for receiving the acceptable granular objects.

Figure 4:
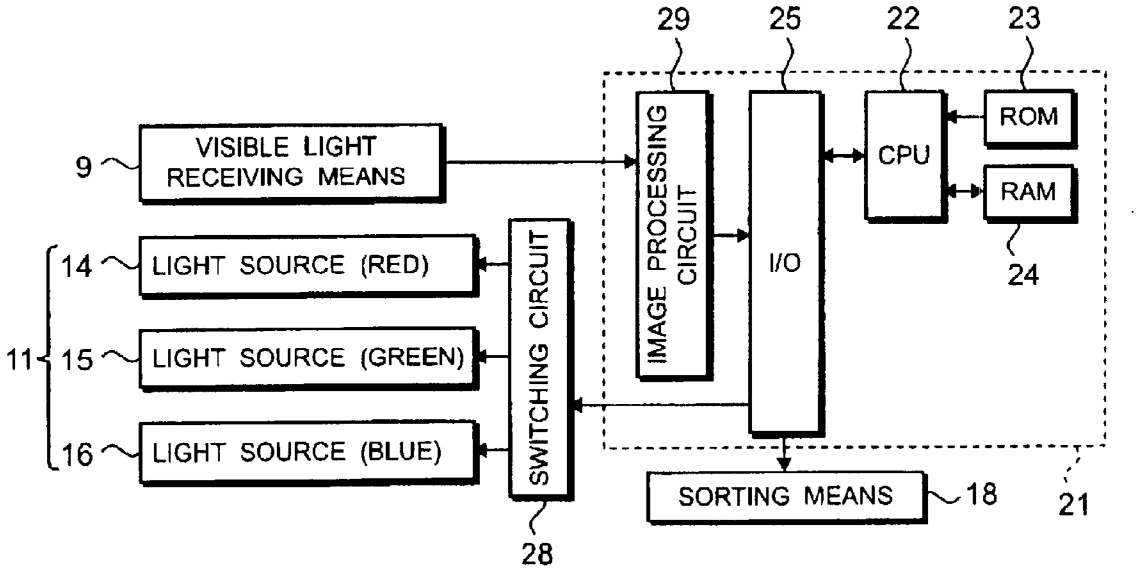
FIG. 4 is a block diagram of the control means for the colored object sorting unit.

Next, a control means 21 is explained with reference to FIG. 4. The control means 21 has a central processing unit (CPU) 22 as a main element, to which electrically connected are a read-only memory (ROM) 23, a random access memory (RAM) 24 and an input/output (I/O) circuit 25. The I/O circuit 25 is coupled to the above visible light receiving means 9 through an image processing circuit 29, an amplifier (not shown) and an A/D converter (not shown). The I/O circuit 25 is also coupled to the red light source 14, the green light source 15 and the blue light source 16 through a switching circuit 28. The I/O circuit 25 is further connected to the sorting means 18. The switching circuit 28 functions to change or switch over the light-on of the respective light sources 14, 15 and 16 in accordance with the signals from the CPU 22. A program for controlling the above sorting unit 1*a* for colored granular objects is stored in the ROM 23.

Figure 5:
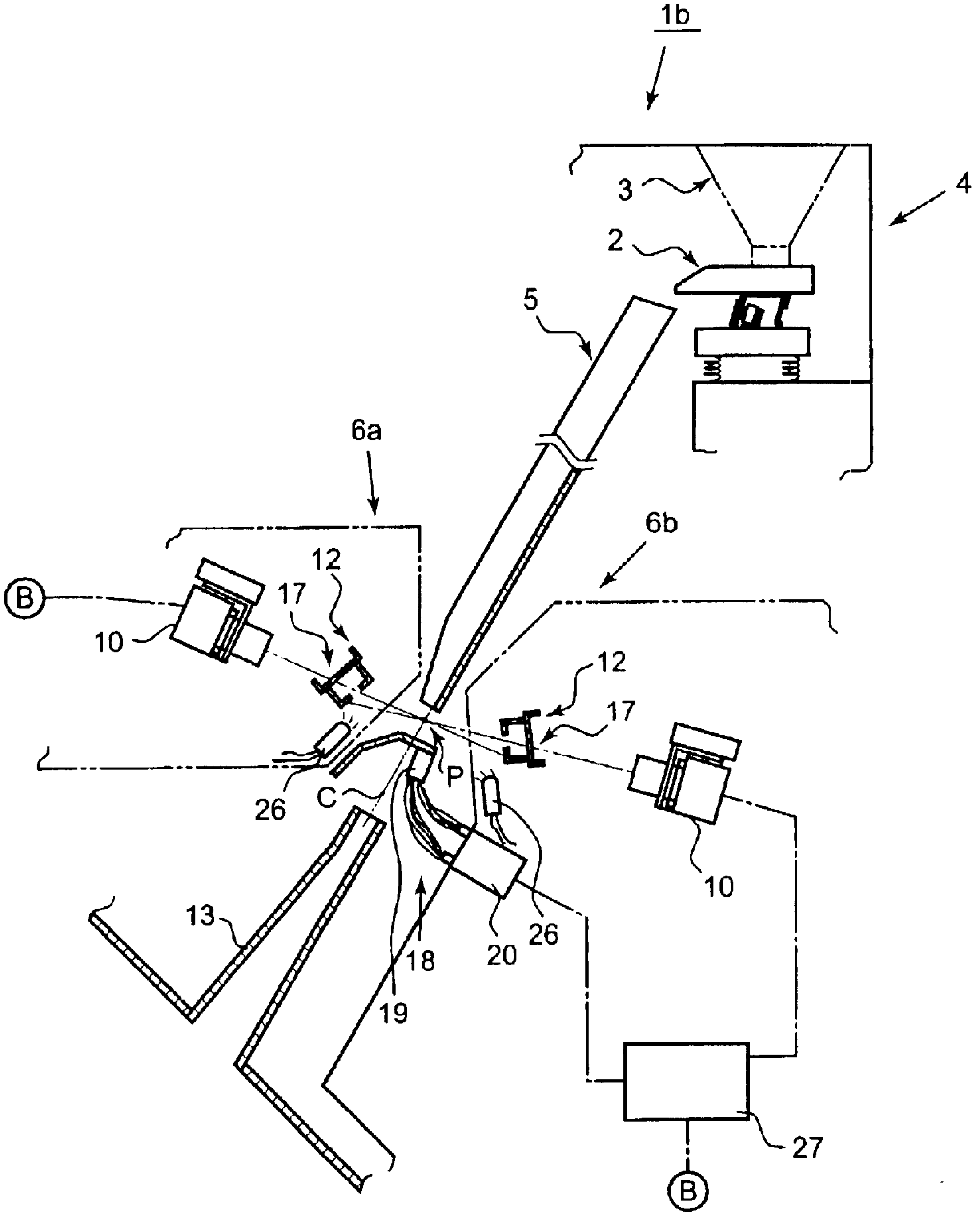
FIG. 5 is a side sectional view of the foreign object sorting unit in the color sorting apparatus.

Next, the foreign object sorting unit 1*b* will be explained with reference to FIG. 5. FIG. 5 is a side sectional view of the foreign object sorting unit 1*b* of the present invention. As the substantial parts of the foreign object sorting unit 1*b* are the same as those of the above explained colored object sorting unit 1*a*, only the portions which are different from each other will be explained. The reference numerals shown in FIG. 2 which are used in the colored object sorting unit 1*a* are also used in the foreign object sorting unit 1*b* to show the same or equivalent parts or elements. The explanation of such same or equivalent parts or elements is not repeated here.

Figure 6:
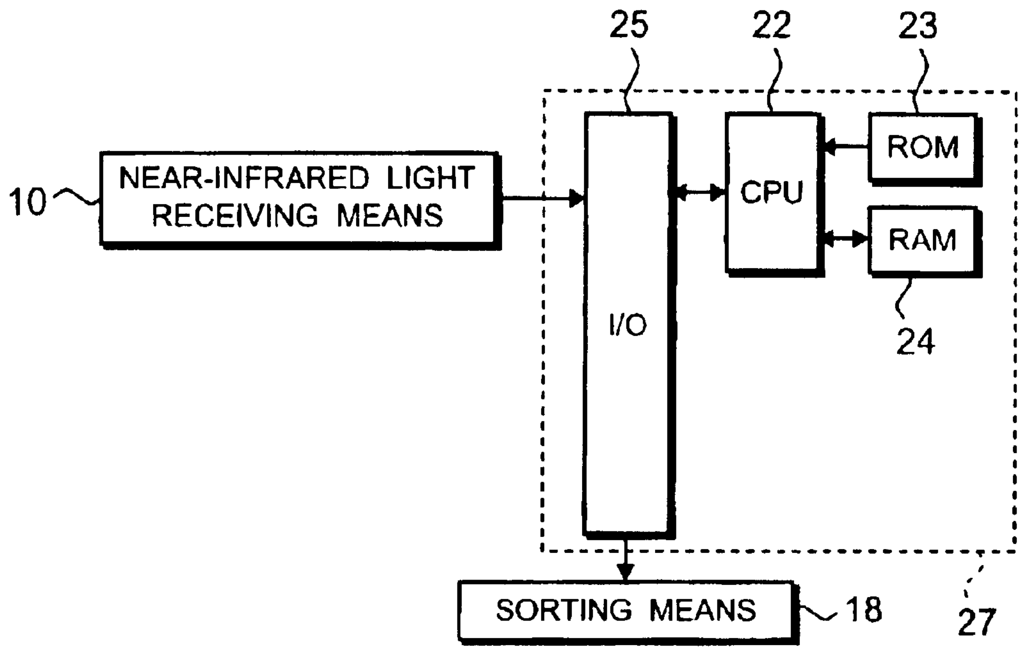
FIG. 6 is a block diagram of the control means for the foreign object sorting unit.

The largest difference in the construction of the foreign object sorting unit 1*b* from the colored object sorting unit 1*a* is that a near-infrared light receiving means 10 is provided, as the respective optical detection means 6*a* and 6*b*, instead of the visual light receiving means 9. The near-infrared light receiving means 10 comprises a condenser lens and a plurality of light receiving elements consisting of InGaAs elements arranged in one row. There is provided an opening 17 in the background plate 12 as shown in FIG. 5. Further difference is that halogen lamps 26, 26 are provided as the light sources instead of the RGB light sources 14, 15 and 16 provided in the colored object sorting unit 1*a*. A dedicated control means 27 is provided for the foreign object sorting unit 1*b*. In the same manner as the control means 21, the control means 27 is provided with a CPU 22 to which a ROM 23, a RAM 24 and an I/O circuit 25 are electrically connected as shown in FIG. 6. The I/O circuit 25 is coupled to the above near-infrared light receiving means 10 through an amplifier (not shown), and also connected to the above sorting means 18. In the ROM 23, a control program for controlling the foreign object sorting unit 1*b* is stored. The CPU 22 compares the light receiving signal detected by the near-infrared light receiving means 10 with the threshold value established in advance and sends out a sorting signal to the sorting means 18. The condenser lens of the near-infrared light receiving unit 10 is so adjusted that the light from the optical detection location P on the falling locus C or the reflected light from the background plate 12 enters into the light receiving sensor through the opening 17 of the background plate 12.

Supply of the raw granular objects to the supply hopper 3 of the colored object sorting unit 1*a* is performed by a bucket elevator 31. The raw granular objects after the colored objects having been sorted out or removed by the above colored object sorting unit 1*a* are forwarded to the inlet portion of a bucket elevator 32 through a passage 30 of the colored object sorting unit 1*a* and, then, supplied to the supply hopper 3 of the foreign object sorting unit 1*b*.

Figure 7A:
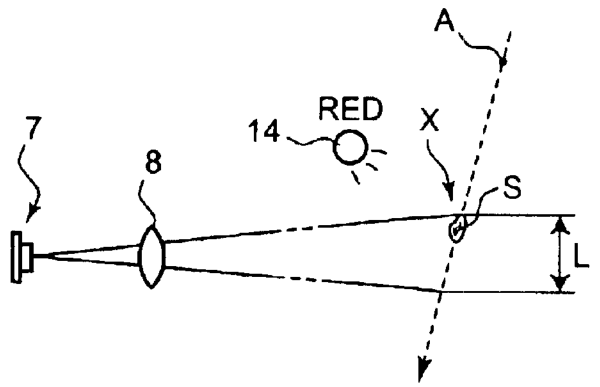
FIGS. 7A, 7B and 7C are diagrams for showing the switching of the light sources with respect to the object passing at the optical detection area.
Figure 7B:
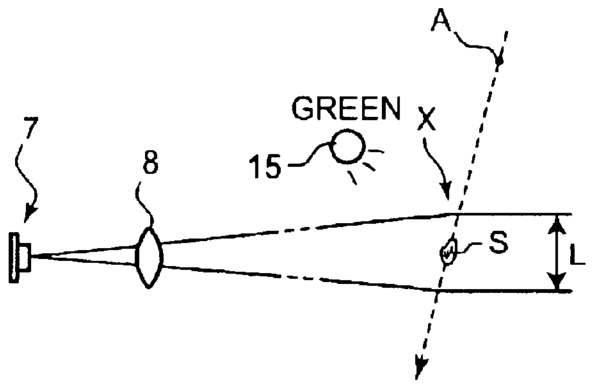
Figure 7C:
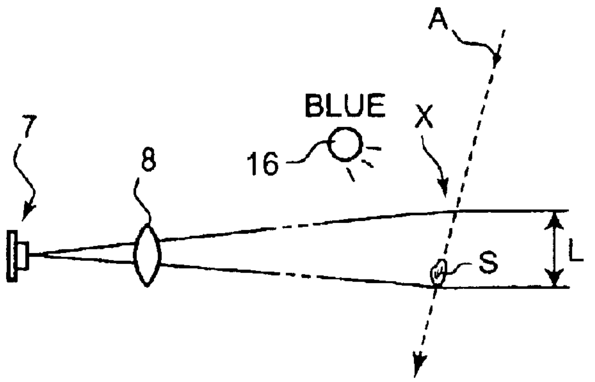

Now, the operation of the above explained color sorting apparatus of the invention will be explained. In the colored object sorting unit 1*a*, the raw granular objects flowing down on the flow chute 5 by the transferring means 4 are released from the lowermost end of the flow chute 5 and fall down naturally along the falling locus A. The visible light receiving means 9 receives the light from each granular object which passes at the optical detection location (focus point) X on the above falling locus A. At this moment, the red light source 14, the green light source 15 and the blue light source 16 are switched or changed over in response to the signals sent to the switching circuit 28 from the CPU 22. This switching operation is effected in such a manner that the sequential and alternative lighting-on operation of the red, green and blue light sources 14, 15 and 16 is completed while the granular object S is passing within the predetermined length L of the above focus point X so that the irradiation of the red, green and blue light on the granular object S is performed while passing through the predetermined length L as shown in FIGS. 7A, 7B and 7C, respectively. The above CCD linear sensor 7 of the visible light receiving means 9 conducts a scanning every time the RGB light sources are changed over and receives the light from the granular object S when the respective color light beams are irradiated thereon.

Figure 8A:
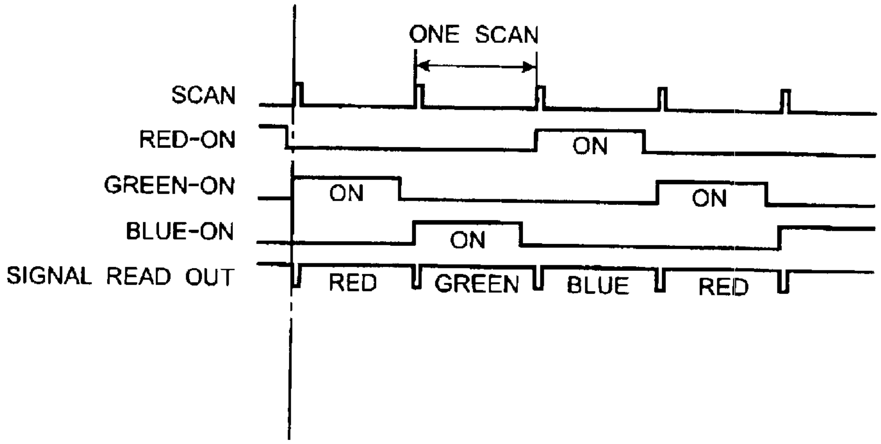
FIGS. 8A and 8B are time-charts which show the relation among the scanning of the CCD linear sensor, the switching operation of the light sources and the signal processing.
Figure 8B:
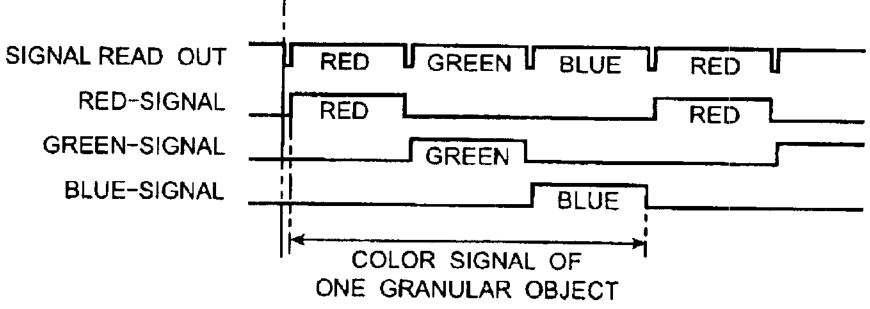
Figure 9:
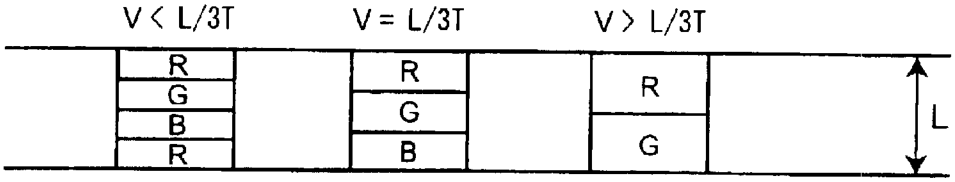
FIG. 9 is a diagram which shows the detected RGB light receiving signal in relation to V and L/3T.
Figure 10:
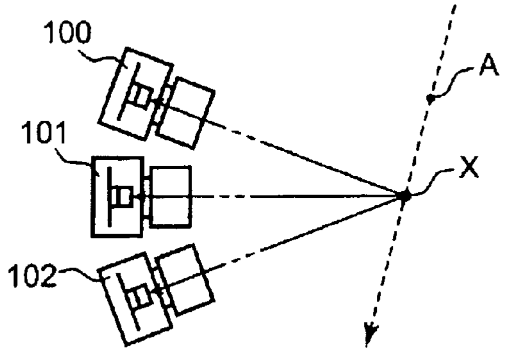
FIG. 10 is a diagram showing a conventional optical detection device with separate three CCD linear sensors.
Figure 11:
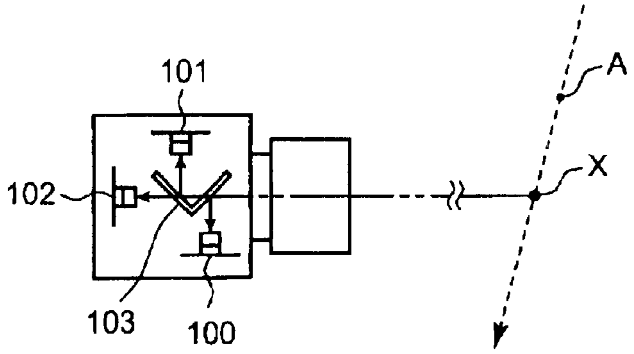
FIG. 11 is a diagram showing a conventional optical detection device with a dichroic mirror in addition to the separate three CCD linear sensors.
Figure 12:
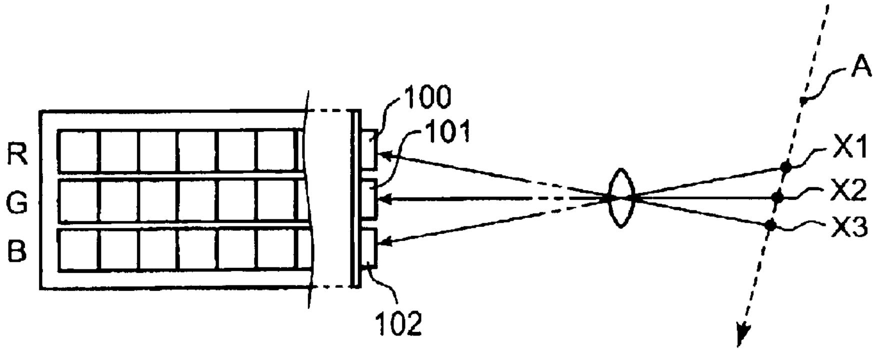
FIG. 12 is a diagram showing a conventional optical detection device in which three CCD linear sensors are arranged vertically in three rows.
Figure 13:
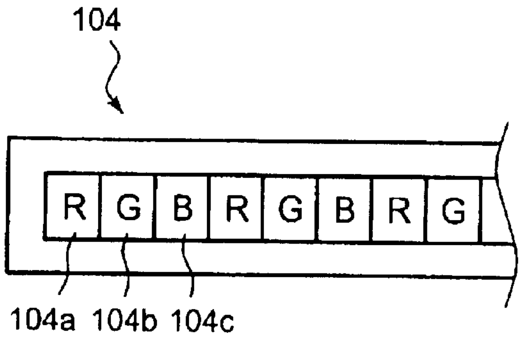
FIG. 13 is a diagram showing a convention CCD linear sensor having a plurality of light receiving elements arranged in one row.
Figure 14:
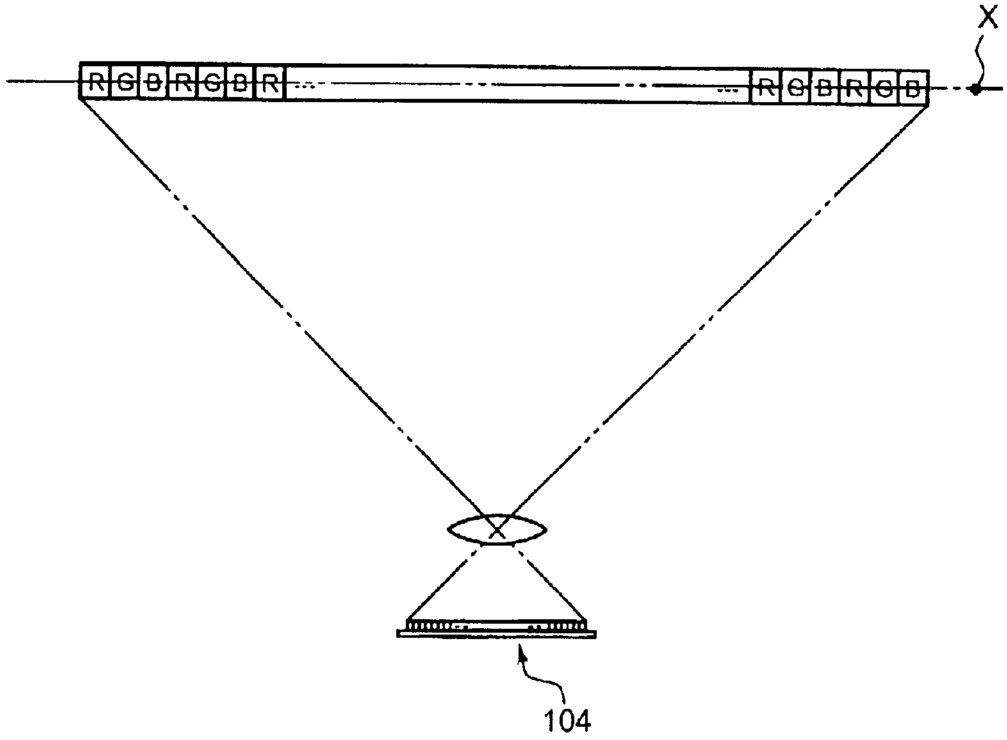
FIG. 14 is a plan view showing the relation between the in-line CCD linear sensor and the optical detection area.
Figure 15:
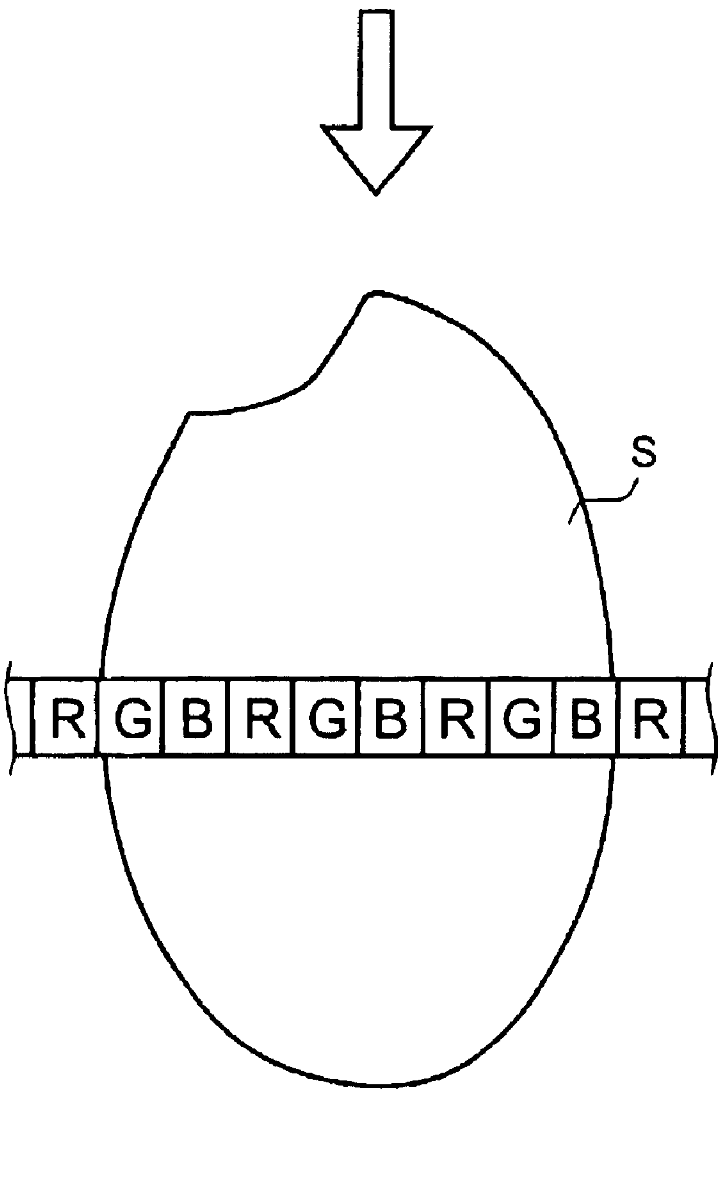
FIG. 15 is a diagram showing the condition where the granular object is optically detected by the in-line CCD linear sensor.

FIG. 8A is a timing chart which shows the respective timings of the scanning of the CCD linear sensor 7 (SCAN), the lighting-on of the red light source 14 (RED-ON), the lighting-on of the green light source 15 (GREEN-ON), the lighting-on of the blue light source 16 (BLUE-ON), and the reading out of the received light signal received by the CCD linear sensor 7 (SIGNAL READ OUT). As shown in FIG. 8A, the reading out "SIGNAL READ OUT" of each light receiving signal, for example, the reading out of the green light receiving signal, is effected at the timing of switching over from one light source to the next light source, that is, from the green light source 15 to the next blue light source 16. The light receiving signal thus derived is forwarded to the image processing circuit 29 through the amplifier and the A/D converter. The image processing circuit 29, as shown in FIG. 8B, sequentially resolves the read out red, green and blue light receiving signals into red, green and blue wavelengths, RED-SIGNAL, GREEN-SIGNAL and BLUE-SIGNAL, respectively, and forms an image of the granular object for each color wavelength. A color signal of the one granular object is recognized based on the image of the first one among the red, green and blue wavelengths obtained from the granular object S at the uppermost position (see FIG. 7A) within the predetermined length L of the optical detection area X, the image of the second one among the RGB wavelengths obtained from the intermediate position (see FIG. 7B) and the image of the third one among the RGB wavelengths obtained from the lowermost position (see FIG. 7C). The color signal thus recognized for the one granular object is compared with the predetermined threshold value. The granular object having the color signal outside the predetermined threshold value is determined as a colored object (defective one) and, based on the result of this determination, the CPU 22 sends out an ejection or rejection signal to the above sorting means 18, thereby removing the colored granular object by a jet air.

The granular objects accepted by the above visible light receiving means 9 are fed to the bucket elevator 32 through the collecting tube 13 and the passage 30, and are supplied to the supply hopper 3 of the foreign object sorting unit 1*b*. The granular objects supplied to the supply hopper 3 flow down on the flow chute 5 in the same manner as in the colored object sorting unit 1*a* and, are released from the lowermost end of the flow chute 5 to fall down naturally along the falling locus C while being irradiated by the halogen lamps 26, 26. The near-infrared light receiving means 10 detects the light from the granular object at the optical detection location P of the falling locus C, and the CPU 22 compares the detected value thus obtained with the predetermined threshold value to determine whether the object is a foreign object or not. If the object is determined as the foreign one, such object is sorted out or removed by the jet air from the sorting means 18 which receives the sorting signal from the CPU 22. The granular objects determined as the acceptable ones by the near-infrared light receiving means 10 are directly received by the collecting tube 13 and are discharged to outside the apparatus. In this way, the colored objects and the foreign objects mixed in the raw granular objects are sorted out by the colored object sorting unit 1*a* and the foreign object sorting unit 1*b*, respectively.

In the colored object sorting unit 1*a* of the present invention, since the CCD linear sensor 7 has a plurality of light receiving elements arranged in one row, each of which is capable of detecting all the red, green and blue wavelengths, the red, green and blue light sources are sequentially switched over while the object is passing within the predetermined optical detection area, and the light from the object is detected in synchronous with the above sequential switching operation of the light sources, it is possible to obtain a color signal based on the red, green and blue wavelengths from the entire surface of each granular object to be optically detected, whereby a sorting accuracy with respect to the colored granular objects is effectively enhanced.

The condition to be satisfied between V and L/3T may well be $V<L/3T$ other than V (falling speed of the granular object)=L (predetermined length of the optical detection area (focus point) X)/3T (speed of one scanning). In this case, since the same color wavelength which has already been detected is repeatedly received, it is necessary to disregard such duplicated light received data when the signal is processed to recognize the color signal of the one granular object. On the other hand, if the condition were to be $V>L/3T$, any of the red, green and blue wavelengths could not be obtained conversely, and a complete color signal with three, that is, red, green and blue wavelengths could not be obtained.

The transferring means for use in the apparatus according to the invention is not limited to the above explained flow chute configuration. A belt-conveyor configuration may well be used as far as the granular objects can be released along the predetermined constant falling locus.

As explained hereinabove, in accordance with the present invention, the red, green and blue light sources are sequentially switched over while the granular object is passing within the predetermined optical detection area and, in synchronization with this switching operation, the CCD linear sensor detects the red, green, blue wavelengths from the entire surface of each granular object to be optically detected. In this way, it is possible to obtain a color signal consisting of three, that is, red, green and blue wavelengths from the entire surface of the granular object to be optically detected and, thus, the sorting accuracy for the colored objects and/or foreign objects is effectively improved. Further, since the CCD linear sensor is one in which a plurality of light receiving elements each of which is capable of detecting all the red, green and blue wavelengths are arranged in one row, the entire optical device can be made compact without an increase in manufacturing cost.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A color sorting apparatus for granular objects comprising:

a transferring means for transferring raw granular objects to an optical detection area;

an optical detection means arranged around a falling locus of the raw granular objects which are released from said transferring means, said optical detection means comprising a CCD linear sensor, an illuminating means and a background means, said optical detection means functioning to detect light from said background means and each of said granular objects irradiated by said illuminating means, said CCD linear sensor including a plurality of light receiving elements arranged in at least one row, each being capable of detecting red, green and blue wavelengths, and said illuminating means including a red light source, a green light source and a blue light source;

a control means for determining whether a granular object at said optical detection area is an acceptable one or an unacceptable one based on the comparison between the detected light signal received by said CCD linear sensor and a threshold value established in advance, wherein said control means sequentially switches over said red, green and blue light sources while said granular object is passing within said optical detection area, and wherein said CCD linear sensor receives light from said granular object in synchronization with said switching of said light sources; and a sorting means for removing said unacceptable granular object from said falling locus in response to a signal from said control means.

2. A color sorting apparatus for granular objects according to claim 1, in which a condition $V \leqq L/3T$ is satisfied, in which T represents a speed of one scanning of said CCD linear sensor, V represents a falling speed of said granular object, and L represents a length of said optical detection area for said CCD linear sensor in the direction of said falling locus.

3. A color sorting apparatus for granular objects according to claim 1, in which each of said plurality of light receiving elements in said CCD linear sensor comprises a Silicon element.

4. A color sorting apparatus for granular objects according to claim 1, in which each of said red, green and blue light sources comprises a light emitting diode (LED).

* * * * *